United States Patent
Puskarich

(10) Patent No.: US 9,317,118 B2
(45) Date of Patent: Apr. 19, 2016

(54) TOUCH SURFACE FOR SIMULATING MATERIALS

(71) Applicant: Apple Inc., Cupertino, CA (US)

(72) Inventor: Paul G. Puskarich, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 14/059,693

(22) Filed: Oct. 22, 2013

(65) Prior Publication Data

US 2015/0109215 A1    Apr. 23, 2015

(51) Int. Cl.
*G06F 3/041* (2006.01)
*G06F 3/01* (2006.01)
*G06F 3/0354* (2013.01)

(52) U.S. Cl.
CPC ............ *G06F 3/016* (2013.01); *G06F 3/03547* (2013.01)

(58) Field of Classification Search
CPC ......................... G06F 3/016; G06F 2203/014
See application file for complete search history.

(56) References Cited

U.S. PATENT DOCUMENTS

| | | |
|---|---|---|
| 4,412,148 A | 10/1983 | Klicker et al. |
| 4,414,984 A * | 11/1983 | Zarudiansky ............. A61F 2/02 414/5 |
| 5,245,734 A | 9/1993 | Issartel |
| 5,283,408 A | 2/1994 | Chen |
| 5,293,161 A | 3/1994 | MacDonald et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |

(Continued)

FOREIGN PATENT DOCUMENTS

| CN | 101409164 | 4/2009 |
|---|---|---|
| EP | 0483955 | 5/1992 |

(Continued)

OTHER PUBLICATIONS

U.S. Appl. No. 14/165,475, filed Jan. 27, 2014, Havskjold et al.

(Continued)

*Primary Examiner* — Dorothy Harris
(74) *Attorney, Agent, or Firm* — Brownstein Hyatt Farber Schreck, LLP

(57) ABSTRACT

A system for simulating materials using touch surfaces includes a touch surface, an actuator and/or an temperature control device, and a control unit. The control unit controls the actuator or the temperature control device to cause at least a portion of the touch surface to simulate a material. Such control may include utilizing the actuator to vibrate the surface to simulate the tactile sensation of texture. Such control may also include utilizing the temperature control device (such as a Peltier device) to control the temperature of the surface in order to simulate the thermal conductivity of a material. In some cases, the temperature control may be performed utilizing a temperature sensor to adjust the temperature of the surface. In various cases, the vibration and/or temperature may be varied over time, such as in response to one or more touches detected using one or more touch sensors.

18 Claims, 5 Drawing Sheets

(56) References Cited

U.S. PATENT DOCUMENTS

| | | | |
|---|---|---|---|
| 5,635,928 | A | 6/1997 | Takagi et al. |
| 5,739,759 | A | 4/1998 | Nakazawa et al. |
| 5,742,242 | A | 4/1998 | Sellers |
| 5,783,765 | A | 7/1998 | Muramatsu |
| 5,793,605 | A | 8/1998 | Sellers |
| 5,812,116 | A | 9/1998 | Malhi |
| 5,818,149 | A | 10/1998 | Safari et al. |
| 5,951,908 | A | 9/1999 | Cui et al. |
| 5,982,304 | A | 11/1999 | Selker et al. |
| 5,982,612 | A | 11/1999 | Roylance |
| 5,995,026 | A | 11/1999 | Sellers |
| 5,999,084 | A | 12/1999 | Armstrong |
| 6,135,886 | A | 10/2000 | Armstrong |
| 6,222,525 | B1 | 4/2001 | Armstrong |
| 6,342,880 | B2 | 1/2002 | Rosenberg et al. |
| 6,351,205 | B1 | 2/2002 | Armstrong |
| 6,373,465 | B2 | 4/2002 | Jolly et al. |
| 6,408,187 | B1 | 6/2002 | Merriam |
| 6,411,276 | B1 | 6/2002 | Braun et al. |
| 6,438,393 | B1 | 8/2002 | Suuronen |
| 6,444,928 | B2 | 9/2002 | Okamoto et al. |
| 6,693,626 | B1 | 2/2004 | Rosenberg |
| 6,717,573 | B1 | 4/2004 | Shahoian et al. |
| 6,809,462 | B2 | 10/2004 | Pelrine et al. |
| 6,864,877 | B2 | 3/2005 | Braun et al. |
| 6,906,697 | B2 | 6/2005 | Rosenberg |
| 6,906,700 | B1 | 6/2005 | Armstrong |
| 6,906,703 | B2 | 6/2005 | Vablais et al. |
| 6,952,203 | B2 | 10/2005 | Banerjee et al. |
| 6,954,657 | B2 | 10/2005 | Bork et al. |
| 6,995,752 | B2 | 2/2006 | Lu |
| 7,022,927 | B2 | 4/2006 | Hsu |
| 7,121,147 | B2 | 10/2006 | Okada |
| 7,123,948 | B2 | 10/2006 | Nielsen |
| 7,130,664 | B1 | 10/2006 | Williams |
| 7,136,045 | B2 | 11/2006 | Rosenberg et al. |
| 7,161,580 | B2 | 1/2007 | Bailey et al. |
| 7,170,498 | B2 | 1/2007 | Huang |
| 7,176,906 | B2 | 2/2007 | Williams et al. |
| 7,182,691 | B1 | 2/2007 | Schena |
| 7,219,561 | B2 | 5/2007 | Okada |
| 7,253,350 | B2 | 8/2007 | Noro et al. |
| 7,333,604 | B2 | 2/2008 | Zernovizky et al. |
| 7,348,968 | B2 | 3/2008 | Dawson |
| 7,392,066 | B2 | 6/2008 | Haparnas |
| 7,423,631 | B2 | 9/2008 | Shahoian et al. |
| 7,446,752 | B2 | 11/2008 | Goldenberg et al. |
| 7,508,382 | B2 | 3/2009 | Denoue et al. |
| 7,561,142 | B2 | 7/2009 | Shahoian et al. |
| 7,569,086 | B2 | 8/2009 | Chandran |
| 7,675,414 | B2 | 3/2010 | Ray |
| 7,679,611 | B2 | 3/2010 | Schena |
| 7,710,399 | B2 | 5/2010 | Bruneau et al. |
| 7,798,982 | B2 | 9/2010 | Zets et al. |
| 7,946,483 | B2 | 5/2011 | Miller et al. |
| 7,952,261 | B2 | 5/2011 | Lipton et al. |
| 7,952,566 | B2 | 5/2011 | Poupyrev et al. |
| 7,956,770 | B2 | 6/2011 | Klinghult et al. |
| 7,961,909 | B2 | 6/2011 | Mandella et al. |
| 8,044,940 | B2 | 10/2011 | Narusawa |
| 8,077,145 | B2 | 12/2011 | Rosenberg et al. |
| 8,081,156 | B2 | 12/2011 | Ruettiger |
| 8,082,640 | B2 | 12/2011 | Takeda |
| 8,125,453 | B2 | 2/2012 | Shahoian et al. |
| 8,174,372 | B2 | 5/2012 | da Costa |
| 8,179,202 | B2 | 5/2012 | Cruz-Hernandez et al. |
| 8,232,494 | B2 | 7/2012 | Purcocks |
| 8,253,686 | B2 | 8/2012 | Kyung et al. |
| 8,344,834 | B2 | 1/2013 | Niiyama |
| 8,378,797 | B2 | 2/2013 | Pance et al. |
| 8,378,965 | B2 | 2/2013 | Gregorio et al. |
| 8,398,570 | B2 | 3/2013 | Mortimer et al. |
| 8,487,759 | B2 | 7/2013 | Hill |
| 8,547,341 | B2 | 10/2013 | Takashima et al. |
| 8,570,291 | B2 * | 10/2013 | Motomura ............ G06F 3/014 345/156 |
| 8,599,152 | B1 | 12/2013 | Wurtenberger et al. |
| 8,633,916 | B2 | 1/2014 | Bernstein et al. |
| 8,710,966 | B2 | 4/2014 | Hill |
| 8,866,600 | B2 | 10/2014 | Yang et al. |
| 8,928,621 | B2 | 1/2015 | Ciesla et al. |
| 9,019,088 | B2 | 4/2015 | Zawacki et al. |
| 9,202,355 | B2 | 12/2015 | Bernstein |
| 2003/0210259 | A1 * | 11/2003 | Liu ....................... G06F 3/016 715/702 |
| 2004/0021663 | A1 | 2/2004 | Suzuki et al. |
| 2004/0127198 | A1 | 7/2004 | Roskind et al. |
| 2005/0057528 | A1 | 3/2005 | Kleen |
| 2005/0107129 | A1 | 5/2005 | Kaewell et al. |
| 2005/0110778 | A1 | 5/2005 | Ben Ayed |
| 2005/0118922 | A1 | 6/2005 | Endo |
| 2005/0248549 | A1 | 11/2005 | Dietz et al. |
| 2006/0154674 | A1 | 7/2006 | Landschaft et al. |
| 2006/0209037 | A1 | 9/2006 | Wang et al. |
| 2006/0239746 | A1 | 10/2006 | Grant |
| 2006/0252463 | A1 | 11/2006 | Liao |
| 2007/0099574 | A1 | 5/2007 | Wang |
| 2007/0152974 | A1 | 7/2007 | Kim et al. |
| 2007/0188450 | A1 | 8/2007 | Hernandez et al. |
| 2008/0084384 | A1 | 4/2008 | Gregorio et al. |
| 2008/0158149 | A1 | 7/2008 | Levin |
| 2008/0165148 | A1 | 7/2008 | Williamson |
| 2008/0181706 | A1 | 7/2008 | Jackson |
| 2008/0192014 | A1 * | 8/2008 | Kent et al. .................. 345/173 |
| 2008/0255794 | A1 | 10/2008 | Levine |
| 2008/0291620 | A1 | 11/2008 | DiFonzo et al. |
| 2009/0115734 | A1 | 5/2009 | Fredriksson et al. |
| 2009/0128503 | A1 | 5/2009 | Grant et al. |
| 2009/0135142 | A1 | 5/2009 | Fu et al. |
| 2009/0167542 | A1 | 7/2009 | Culbert et al. |
| 2009/0167702 | A1 | 7/2009 | Nurmi |
| 2009/0167704 | A1 | 7/2009 | Terlizzi et al. |
| 2009/0218148 | A1 | 9/2009 | Hugeback et al. |
| 2009/0225046 | A1 | 9/2009 | Kim et al. |
| 2009/0267892 | A1 | 10/2009 | Faubert |
| 2009/0267920 | A1 | 10/2009 | Faubert et al. |
| 2009/0305744 | A1 | 12/2009 | Ullrich |
| 2009/0313542 | A1 | 12/2009 | Cruz-Hernandez et al. |
| 2010/0048256 | A1 | 2/2010 | Huppi et al. |
| 2010/0053087 | A1 | 3/2010 | Dai et al. |
| 2010/0141606 | A1 | 6/2010 | Bae et al. |
| 2010/0194547 | A1 | 8/2010 | Terrell et al. |
| 2010/0231508 | A1 | 9/2010 | Cruz-Hernandez et al. |
| 2010/0231550 | A1 * | 9/2010 | Cruz-Hernandez et al. .. 345/174 |
| 2010/0265197 | A1 * | 10/2010 | Purdy ................... G06F 3/0414 345/173 |
| 2010/0328229 | A1 | 12/2010 | Weber et al. |
| 2011/0077055 | A1 | 3/2011 | Hill |
| 2011/0107958 | A1 | 5/2011 | Pance et al. |
| 2011/0121765 | A1 | 5/2011 | Anderson et al. |
| 2011/0128239 | A1 | 6/2011 | Polyakov et al. |
| 2011/0203912 | A1 | 8/2011 | Niu |
| 2011/0291950 | A1 | 12/2011 | Tong |
| 2012/0068957 | A1 | 3/2012 | Puskarich et al. |
| 2012/0075198 | A1 | 3/2012 | Sulem et al. |
| 2012/0127088 | A1 | 5/2012 | Pance et al. |
| 2012/0268412 | A1 | 10/2012 | Cruz-Hernandez et al. |
| 2012/0327006 | A1 | 12/2012 | Israr et al. |
| 2013/0120290 | A1 * | 5/2013 | Yumiki et al. ................ 345/173 |
| 2013/0124076 | A1 | 5/2013 | Bruni et al. |
| 2013/0181913 | A1 | 7/2013 | Cole et al. |
| 2013/0300549 | A1 | 11/2013 | Hill |
| 2014/0091857 | A1 | 4/2014 | Bernstein |
| 2014/0232534 | A1 | 8/2014 | Birnbaum et al. |
| 2014/0267076 | A1 | 9/2014 | Birnbaum et al. |
| 2014/0267952 | A1 * | 9/2014 | Sirois ............................. 349/12 |
| 2015/0005039 | A1 | 1/2015 | Liu et al. |
| 2015/0324049 | A1 | 11/2015 | Kies et al. |

FOREIGN PATENT DOCUMENTS

| | | |
|---|---|---|
| EP | 1047258 | 10/2000 |
| EP | 1686776 | 8/2006 |

(56) References Cited

FOREIGN PATENT DOCUMENTS

| | | |
|---|---|---|
| EP | 2073099 | 6/2009 |
| EP | 2194444 | 6/2010 |
| EP | 2395414 | 12/2011 |
| EP | 2631746 | 8/2013 |
| JP | 2004236202 | 8/2004 |
| KR | 20050033909 | 4/2005 |
| TW | 200518000 | 11/2007 |
| WO | WO 97/16932 | 5/1997 |
| WO | WO 01/59588 | 8/2001 |
| WO | WO 02/073587 | 9/2002 |
| WO | WO 03/038800 | 5/2003 |
| WO | WO 2006/057770 | 6/2006 |
| WO | WO 2007/114631 | 10/2007 |
| WO | WO 2008/075082 | 6/2008 |
| WO | WO 2009/038862 | 3/2009 |
| WO | WO 2009/068986 | 6/2009 |
| WO | WO 2009/097866 | 8/2009 |
| WO | WO 2009/122331 | 10/2009 |
| WO | WO 2009/150287 | 12/2009 |
| WO | WO 2010/087925 | 8/2010 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/493,190, filed Sep. 22, 2014, Hoen.
U.S. Appl. No. 14/512,927, filed Oct. 13, 2014, Hill.

Kim et al., "Tactile Rendering of 3D Features on Touch Surfaces," UIST '13, Oct. 8-11, 2013, St. Andrews, United Kingdom, 8 pages.

* cited by examiner

TOUCH SURFACE FOR SIMULATING MATERIALS

TECHNICAL FIELD

This disclosure relates generally to touch surfaces, and more specifically to a touch surface for simulating materials.

BACKGROUND

Electronic devices may have touch devices that include touch surfaces for receiving input from, and/or providing output to, one or more users. Such touch devices may include touch screens, track pads, button elements, and/or other such touch devices. In some cases, the touch devices may be able to detect a touch (such as the touch of a user's body part, a stylus, and/or other such touch) and interpret that touch as input. Such touch detection may include detection that a touch has occurred, the location of the touch, the force of the touch, the duration of the touch, movement across the touch surface associated with the touch, and/or any other such characteristics of the touch. In various cases, the touch device may be able to provide output, such as haptic feedback and/or output.

Typically, touch surfaces are smooth surfaces constructed of various plastics, metals, or glass. The tactile characteristics of such touch surfaces may be limited by the physical characteristics of the materials utilized to construct the surfaces.

SUMMARY

The present disclosure discloses systems and methods for simulating materials using touch surfaces. In one or more embodiments, a system for simulating materials using touch surfaces may include at least one touch surface, at least one actuator or at least one temperature control device, and at least one control unit. The control unit may control the actuator or the temperature control device to cause at least a portion of the touch surface to simulate a material.

Such control may include utilizing the actuator to vibrate at least a portion of the touch surface. Such vibrations may simulate the tactile sensation of texture. In some cases, the vibrations may be varied over time, such as in response to one or more touches detected using one or more touch sensors.

Such control may also include utilizing the temperature control device (such as a Peltier device) to control the temperature of at least a portion of the touch surface in order to simulate the tactile sensation of the thermal conductivity of a material. In some cases, the temperature control may be performed utilizing data from one or more temperature sensors to adjust the temperature of the touch surface. In some cases, the temperature may be varied over time, such as in response to one or more touches detected using one or more touch sensors.

In various implementations, the entire touch surface may be caused to simulate the material. However, in other implementations, the touch surface may include a plurality of regions that are each controllable. In some cases, each of the plurality of regions may include one or more actuators, temperature control devices, touch sensors, and/or temperature sensors. Further, in various cases, each of the plurality of regions may be simultaneously controllable to simulate different materials than one or more of the other regions.

In some implementations, the touch surface may include a layer of diamond material. The diamond material may be a layer of chemical vapor deposited diamond, such as a layer of carbon vapor deposited diamond. Such a layer of diamond may provide extremely high thermal conductivity, extreme mechanical hardness, and/or optical broadband optical transparency.

In some embodiments, a method for simulating materials using a touch surface may include determining at least one material to simulate using a touch surface and controlling at least one of at least one actuator or at least one temperature control device to case the at least one touch surface to simulate at least one material.

In various embodiments, a touch device may include at least one touch surface, at least one actuator or at least one temperature control device, and at least one control unit. The control unit may control the actuator or the temperature control device to cause at least a portion of the touch surface to simulate a material.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
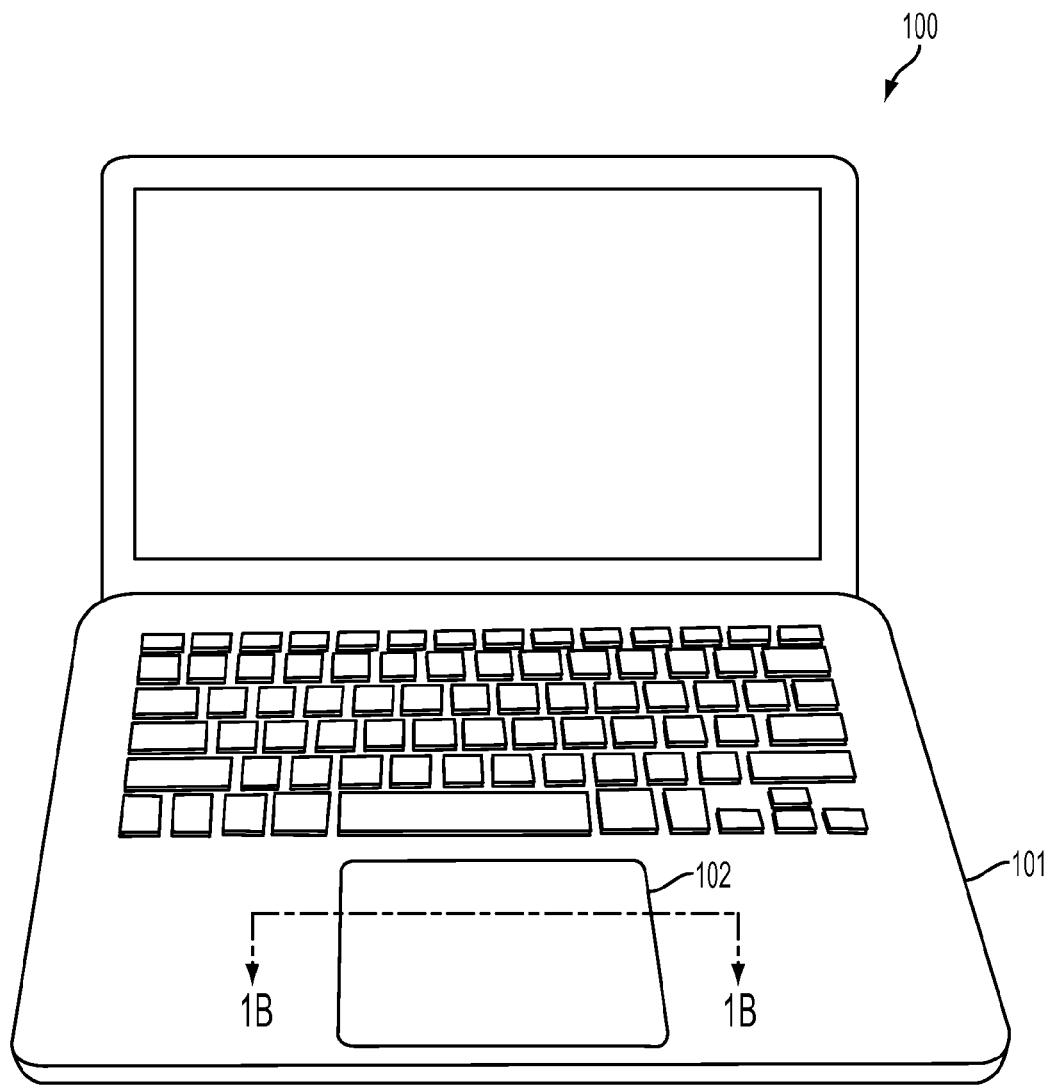
FIG. 1A is a isometric view of an example system for simulating materials using touch surfaces.

The description that follows includes sample systems, methods, and computer program products that embody various elements of the present disclosure. However, it should be understood that the described disclosure may be practiced in a variety of forms in addition to those described herein.

The present disclosure discloses systems and methods for simulating materials using touch surfaces. A touch device may include at least one touch surface, at least one actuator or at least one temperature control device, and at least one control unit. The control unit may control the actuator or the temperature control device to cause at least a portion of the touch surface to simulate a material.

Such control may include utilizing the actuator to move vertically and/or horizontally to vibrate at least a portion of the touch surface. Such vibrations may simulate the tactile sensation of texture. Rougher surfaces may be simulated by producing stronger vibrations than those produces to simulate smoother surfaces. Simulation of a material as smooth as the touch surface itself may include not utilizing the actuator to produce vibrations.

In some cases, the vibrations may be varied over time, such as in response to one or more touches detected using one or more touch sensors (such as position sensors, force sensors, capacitive sensors, and/or other sensors capable of detecting one or more characteristics of a touch). For example, the vibrations may be varied over time in response to detection of a touch moving across the touch surface in order to simulate the grain of a wood surface.

Such control may also include utilizing the temperature control device to control the temperature of at least a portion of the touch surface. Such a temperature control device may include at least one Peltier device. The temperature control may simulate the tactile sensation of the thermal conductivity of a material. For example, a glass surface may be controlled to have the temperature of a relatively cooler metal material and/or a relatively warmer wood material. In some cases, the temperature control may be performed utilizing data from one or more temperature sensors that detect a temperature of the touch surface. In such cases, the temperature control device may be adjusted based on the data to adjust the temperature of the touch surface.

In some cases, the temperature may be varied over time, such as in response to one or more touches detected using one or more touch sensors. For example, a metal material may increase in temperature while touched in response to heat from a user's finger. To simulate such a metal material, the temperature of a touch surface may varied over time to increase when a user touch is maintained.

In various implementations, the actuator(s) and/or temperature control device(s) may be controlled to cause the entire touch surface to simulate the material. However, in other implementations, the touch surface may include a plurality of regions that are each controllable to simulate one or more materials. In some cases, each of the plurality of regions may include one or more actuators, temperature control devices, touch sensors, and/or temperature sensors. Further, in various cases, each of the plurality of regions may be simultaneously controllable to simulate different materials than one or more of the other regions.

In some implementations, the touch surface may include a layer of diamond material. The diamond material may be a layer of chemical vapor deposited diamond, such as a layer of carbon vapor deposited diamond. Such a layer of diamond may provide extremely high thermal conductivity (which may exceed that of copper by approximately a factor of five), extreme mechanical hardness (providing exceptional wear resistance), and/or optical broadband optical transparency (being transparent from approximately ultraviolet to far infrared).

FIG. 1A is a isometric view of an example system 100 for simulating materials using touch surfaces. The system may include an electronic device 101 and a touch device 102. The touch device may be formed from a variety of different materials such as one or more metals, plastic, glass, and/or any other such suitable material.

As illustrated, the electronic device 101 is a laptop computing device. However, it is understood that this is an example. In various implementations, the electronic device may be any electronic device that includes a touch device 102 and/or any touch surface without departing from the scope of the present disclosure. For example, such an electronic device may be a desktop computing device, a mobile computing device, a tablet computing device, a laptop computing device, a digital media player, a kitchen appliance, a display device, a cellular phone, a smart phone, a wearable device, an automobile, and/or any other kind of electronic device.

Further, as illustrated, the touch device 102 is a touch pad. However, it is understood that this is an example. In various implementations, the touch device may be any kind of touch surface without departing from the scope of the present disclosure. For example, the touch device may be a track pad, a touch screen, a button element, and/or any other kind of touch surface.

Figure 1B:
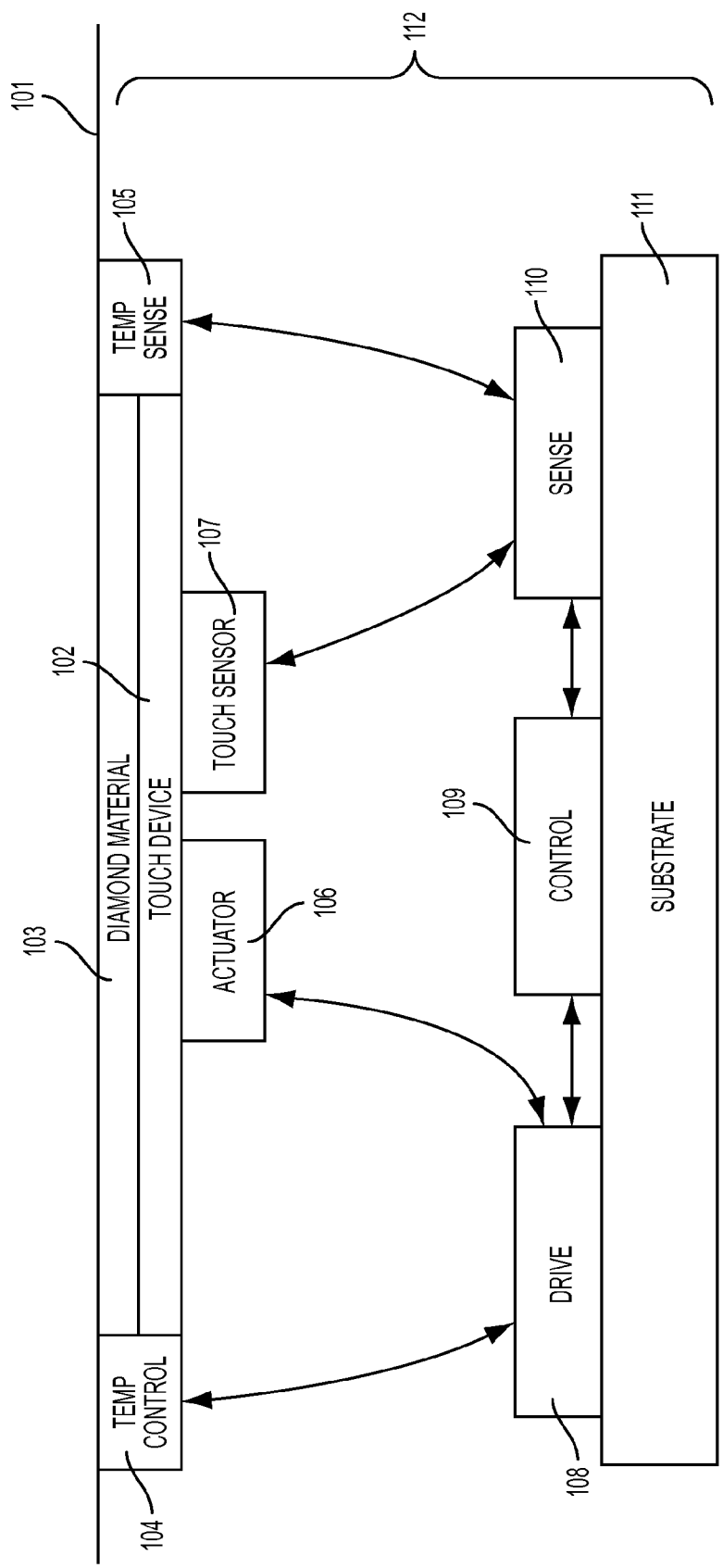
FIG. 1B is a front cross-sectional view of the example system of FIG. 1 taken along line 1B in FIG. 1.

FIG. 1B is a front cross-sectional view of the example system 100 of FIG. 1 taken along line 1B in FIG. 1. As illustrated, the touch device 102 may be part of a touch device system 112. The touch device system may include one or more temperature control devices 104 (such as one or more Peltier devices), temperature sensors 105, actuators 106 (such as one or more electromechanical actuators), touch sensors 107 (such as one or more position sensors, force sensors, capacitive sensors, and/or other sensors capable of detecting one or more characteristics of a touch), drive circuits 108, control units 109 (such as one or more processing units), sensing circuits 110, and/or substrates 111 (such as one or more printed circuit boards).

The control unit 109, drive circuit 108, and sensing circuit 110 may be mounted to the substrate 111. The drive circuit may be communicably coupled to the actuator 106 and/or the temperature control device 104 and the sensing circuit may be coupled to the touch sensor 107 and/or the temperature sensor 105. The control unit may be communicably coupled to the drive circuit and/or the sensing circuit in order to receive data from the touch sensor and/or the temperature sensor and/or control the actuator and/or the temperature control device in order to simulate one or more materials.

The actuator 106 may be operable to move (such as horizontally or vertically) in order provide one or more vibrations via the touch device 102. Such vibrations may be provided as haptic output and/or feedback. Such vibrations may also be provided to simulate the tactile sensation of the texture of a material. The actuator may vibrate all of the touch device or just one or more portions of the touch device.

For example, the control unit 109 may cause the actuator 106 to vibrate in order to simulate a rougher material (such as wood) than the material from the touch device 102 is actually made (such as plastic). The control unit may cause the actuator to vibrate more to simulate rougher materials and less to simulate smoother materials. When simulating a material as smooth or smoother than the materials from which the touch device is actually made, the control unit may not cause the actuator to vibrate.

The control unit 109 may vary the vibrations that the actuator 106 is caused to provide over time. In some cases, the vibrations may be varied based on one or more touches detected by the touch sensor 107. For example, the control unit may increase the vibrations provided by the actuator in response to the touch sensor detecting that a user's finger is moving across the touch device 102 in order to simulate the grain of a wood material. By way of another example, the control unit may increase the vibrations provided by the actuator in response to the touch sensor detecting that a user's finger is pressing with increase force on the touch device 102 in order to simulate the application of increased force to the texture of the material.

The temperature control device 104 may be operable to control the temperature (such as by increasing, decreasing, and/or maintaining the temperature) of the touch device 102. This control may be accomplished by heating, cooling, sinking heat, dissipating or diffusing heat, activating fans or other cooling mechanisms, and so on. Such temperature control may simulate the tactile sensation of the thermal conductivity of a material. The temperature control device may control the temperature of all of the touch device or just one or more portions of the touch device.

For example, the control unit 109 may cause the temperature control device 104 to decrease the temperature of the touch device 102 in order to simulate a relatively cooler material (such as metal) than the material from the touch device is actually made (such as glass). By way of another example, the control unit may cause the temperature control device to increase the temperature of the touch device in order to simulate a relatively warmer material (such as wood) than the material from the touch device is actually made (such as metal).

The control unit 109 may vary the temperature that the temperature control device 104 is caused to control over time. In some cases, the temperature may be varied based on one or more touches detected by the touch sensor 107. For example, the control unit may increase the temperature of a particular portion of the touch device 102 in response to the touch sensor detecting that a user's finger is touching that portion for an extended period of time in order to simulate the warming of a metal material in response to sustained exposure to heat from the user's finger.

Figure 1C:
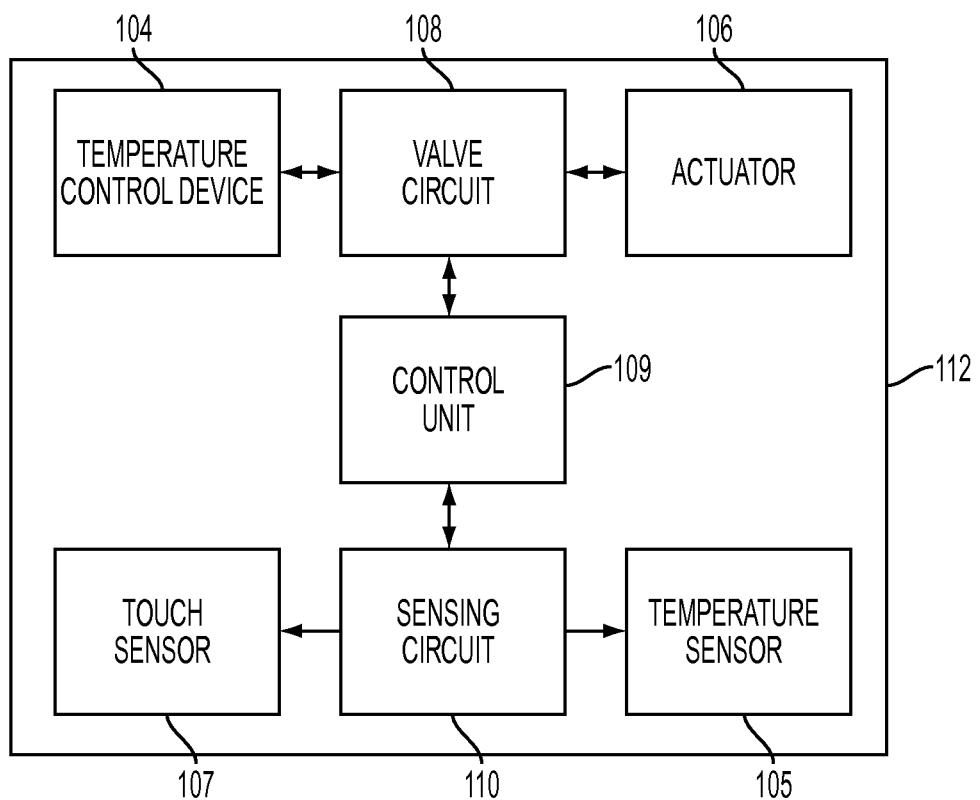
FIG. 1C is a block diagram illustrating an example functional relationship of the components of the touch device system of the example system of FIG. 1B.

FIG. 1C is a block diagram illustrating an example functional relationship of the components of touch device system 112 of the example system 100 of FIG. 1B. As illustrated, the control unit 109 may be communicably coupled to the drive circuit 108 and/or the sensing circuit 110, the drive circuit may be communicably coupled to the temperature control device 104 and/or the actuator 106, and/or the sensing circuit may be communicably coupled to the touch sensor 107 and/or the temperature sensor 105.

In some implementations, the touch device system 112 may include additional components not shown. For example, in some implementations, the touch device system may include one or more non-transitory storage media (not shown), which may take the form of, but is not limited to, a magnetic storage medium; optical storage medium; magneto-optical storage medium; read only memory; random access memory; erasable programmable memory; flash memory; and so on. Such a non-transitory storage medium may include one or more settings (such as user defined settings, default settings, system configuration settings, and so on) which specify one or more materials to simulate, how to determine which material to simulate, conditions to evaluate regarding when and which material to simulate, specifications as to how to simulate a particular material, and so on.

Although the actuator 106 and the temperature control device 104 are shown and described as separate components, it is understood that this is an example. In various implementations, these components may be separate components, portions of the same component (such as a piezoelectric actuator that also produces heat along with changing shape in response to electrical charge), combined components (such as temperature control devices laminated or otherwise attached to the top of actuators), and so on.

Further, in some cases, use of the actuator 106 may produce undesirable heat. For example, an actuator that produces heat during operation may cause the temperature of a touch surface to be warmer than the temperature of a cement surface in order to produce sufficient vibration to simulate the texture of the cement. To ameliorate this heating, the touch surface may be cooled (or heat sunk or otherwise heat dissipated or diffused) by one or more temperature cooling devices in order to prevent the simulation of texture from causing the touch surface to have temperature properties even less like the simulated material than it would normally.

Figure 2:
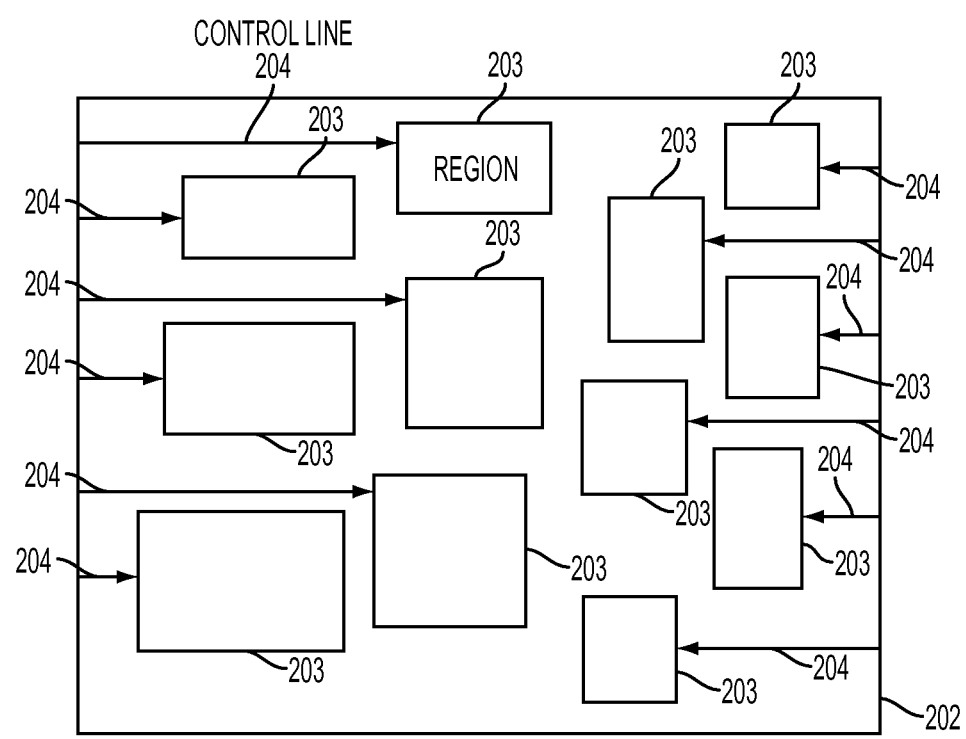
FIG. 2 is a bottom view of an alternative embodiment of a portion of the example system of FIG. 1A.

In various implementations, the actuator(s) and/or temperature control device(s) may be controlled to cause the entire touch surface to simulate the material. However, in other implementations, the touch surface may include a plurality of regions that are each controllable to simulate one or more materials. For example, FIG. 2 is a bottom view of an alternative embodiment of a portion of the example system 100 of FIG. 1. As illustrated, in this embodiment the touch device 202 includes a plurality of regions 203 that are connected to one or more control lines 204.

In some cases, the control lines 204 may connect to the temperature control device 104 and may be operable to control the temperature of the regions 203 under the direction of the temperature control device. In other cases, the regions may each include an actuator 106 and the control lines may connect the actuators to the drive circuit 108 in order to control the respective actuator for a particular region.

In still other cases, the regions 203 may each include one or more temperature control devices 104, temperature sensors 105, actuators 106, and/or touch sensors 107. As such, the control lines 204 may connect to one or more of the drive circuit 108 and/or the sensing circuit 110 such that the control unit 109 is able to independently control vibration and/or temperature of each of the regions.

In various cases, a touch surface such as plastic may have multiple regions that are individually controllable and may include individually controllable actuators and/or temperature control devices. For example, such regions may be individually controllable such that one region is controlled to simulate the rougher texture of wood and heated to simulate the relatively warmer temperature of wood while another region is controlled to simulate the smoother texture of metal and cooled (or heat sunk or otherwise heat dissipated or diffused) to simulate the relatively cooler temperature of metal. In this way, a single touch surface may be utilized to simulate multiple different materials simultaneously.

By way of another example, such regions may be individually controllable to simulate more complex behaviors of a material. The temperature of a touched portion of a glass touch surface may be increased to simulate a metal material increasing in temperature in response to the heat of the touch. However, due to the temperature properties of the glass touch surface, the temperature from the heating may diffuse to surrounding areas causing the surrounding areas to have a higher temperature than if the surface was actually metal. As such, in addition to heating the portion corresponding to the touch, the surrounding portions may be cooled (or heat sunk or otherwise heat dissipated or diffused) such that the temperature of the surrounding portions more closely simulates the diffusion of heat from the touch in metal.

Returning to FIG. 1B, in some implementations, the touch surface may include a layer of diamond material 103. The diamond material may be a layer of chemical vapor deposited diamond, such as a layer of carbon vapor deposited diamond. Such a layer of diamond may provide extremely high thermal conductivity (which may exceed that of copper by approximately a factor of five), extreme mechanical hardness (providing exceptional wear resistance), and/or optical broadband optical transparency (being transparent from approximately ultraviolet to far infrared).

Figure 3:
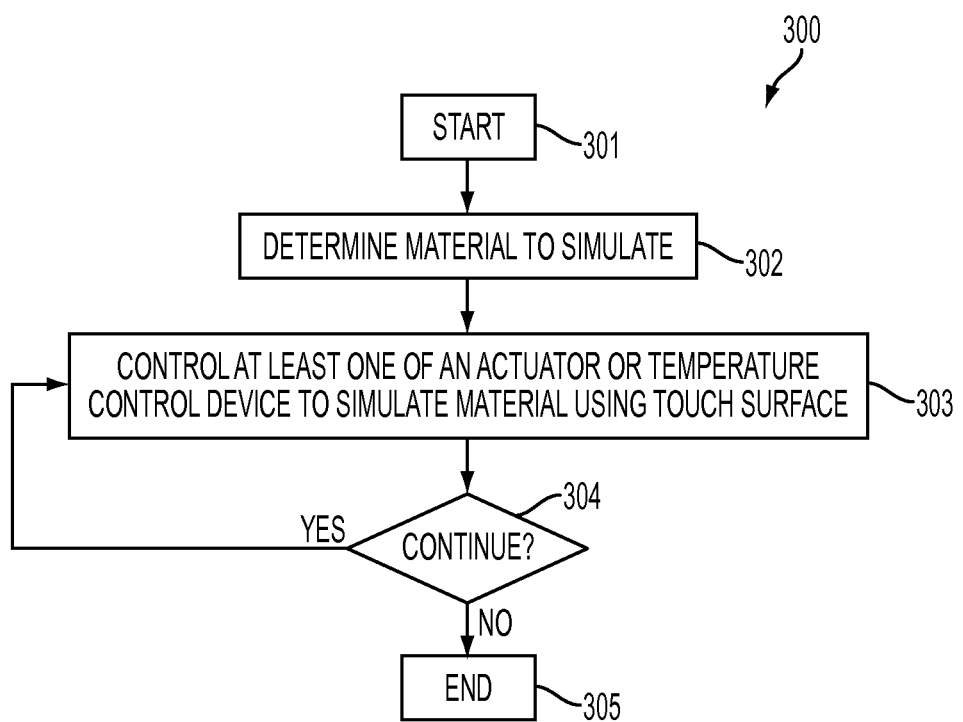
FIG. 3 is a flow chart illustrating a method for simulating materials using touch surfaces. This method may be performed by the system of FIG. 1A-1C or 2.

FIG. 3 is a flow chart illustrating a method 300 for simulating materials using touch surfaces. This method may be performed by the system 100 of FIG. 1A-1C and/or 2.

The flow may begin at block 301 and proceed to block 302 where the control unit 109 determines a material to simulate. The flow then proceeds to block 303 where the control unit controls at least one of the actuator 106 or temperature control device 104 to simulate the material using a touch surface. The flow then proceeds to block 304.

At block 304, the control unit 109 determines whether or not to continue simulating the material using the touch surface. Such continuation may include updating the control based on one or more detected temperatures, one or more detected touches, the passage of time, one or more settings specifying how simulation is to be controlled, and so on.

If so, the flow returns to block 303 where the control unit continues to control at least one of the actuator or the temperature control device to continue simulating the material using the touch surface. Otherwise, the flow proceeds to block 305 and ends.

As discussed above and illustrated in the accompanying figures, the present disclosure discloses systems and methods for simulating materials using touch surfaces. A touch device may include at least one touch surface, at least one actuator or at least one temperature control device, and at least one control unit. The control unit may control the actuator or the temperature control device to cause at least a portion of the touch surface to simulate a material.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. A system for simulating materials using a touch surface, comprising:
   a touch surface for an electronic device;
   at least one temperature control device operable to control a temperature of at least a portion of the touch surface;
   at least one actuator operable to vibrate the portion of the touch surface; and
   at least one control unit that controls the at least one temperature control device and the at least one actuator to cause the portion of the touch surface to simulate a material;
   wherein:
   the at least one control unit varies the temperature of the portion of the touch surface based on a duration of a touch to simulate the material changing temperature in response to the touch over the duration; and
   the at least one control unit controls heat produced by the at least one actuator to prevent interference with the simulation of the temperature of the material with the touch surface.

2. The system of claim 1, wherein simulating the material changing temperature in response to the touch over the duration comprises simulating the material increasing in temperature in response to a heat of the touch.

3. The system of claim 1, wherein the at least one temperature control device comprises at least one Peltier device.

4. The system of claim 1, further comprising at least one temperature sensor wherein the at least one control unit controls the at least one temperature control device based at least on a temperature of the touch surface detected by the at least one temperature sensor.

5. The system of claim 1, further comprising at least one touch sensor that detects at least one characteristic of at least one touch on the touch surface.

6. The system of claim 5, wherein the at least one control unit controls the at least one temperature control device based at least on at least one characteristic.

7. The system of claim 6, wherein the at least one characteristic comprises at least one of at least one location of the at least one touch, at least one duration of the at least one touch, at least one movement associated with the at least one touch, or at least one force of the at least one touch.

8. The system of claim 7, wherein the at least one control unit varies the control of the at least one temperature control device over time based at least on data from the at least one touch sensor.

9. The system of claim 1, wherein
   the at least one control unit controls the actuator to increase vibration to cause the portion of the touch surface to simulate a rougher material and decrease vibration to cause the portion of the touch surface to simulate a material to simulate a smoother material.

10. The system of claim 1, wherein
    the at least one control unit controls the at least one actuator to simulate a texture of the material.

11. The system of claim 1, wherein the at least one control unit controls the at least one temperature control device to simulate a temperature of the material.

12. The system of claim 1, wherein the touch surface comprises a plurality of portions that are each controllable by the at least one control unit to simulate the material.

13. The system of claim 1, wherein the at least one control unit controls the at least one temperature control device to cause the portion of the touch surface to simulate an additional material.

14. The system of claim 1, wherein the touch surface comprises at least one of a touch screen, a track pack, or a button element.

15. The system of claim 1, wherein the touch surface comprises at least one of glass, plastic, or metal.

16. The system of claim 1, further comprising a layer of diamond material on the touch surface.

17. The system of claim 16, wherein the layer of diamond material comprises a chemical vapor deposited layer.

18. The system of claim 17, wherein the chemical vapor deposited layer comprises a carbon vapor deposited layer.

* * * * *